D. W. TOZIER.
SPRING TOOTH HARROW.
APPLICATION FILED APR. 30, 1917.
1,278,793.
Patented Sept. 10, 1918.
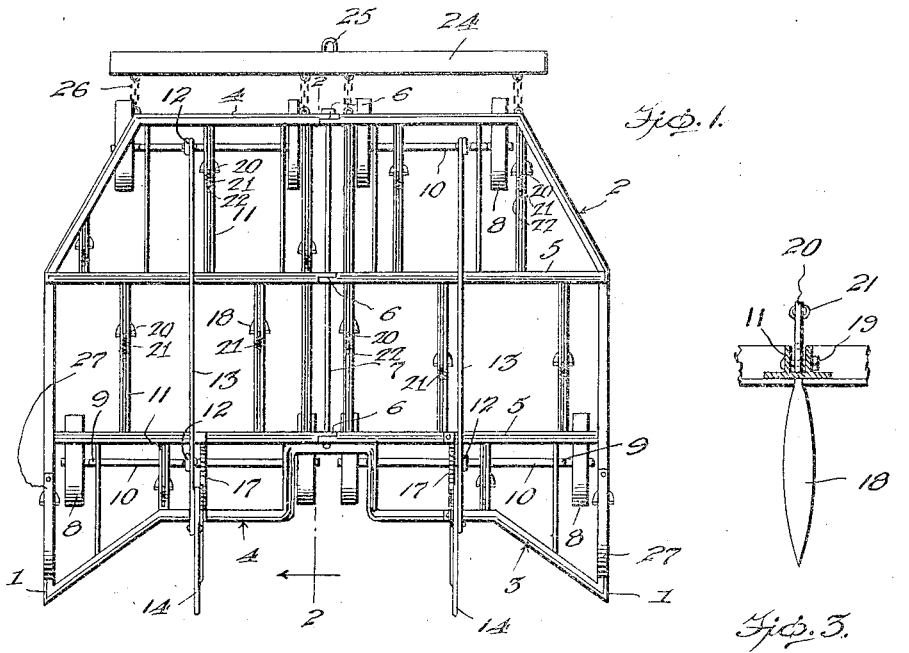
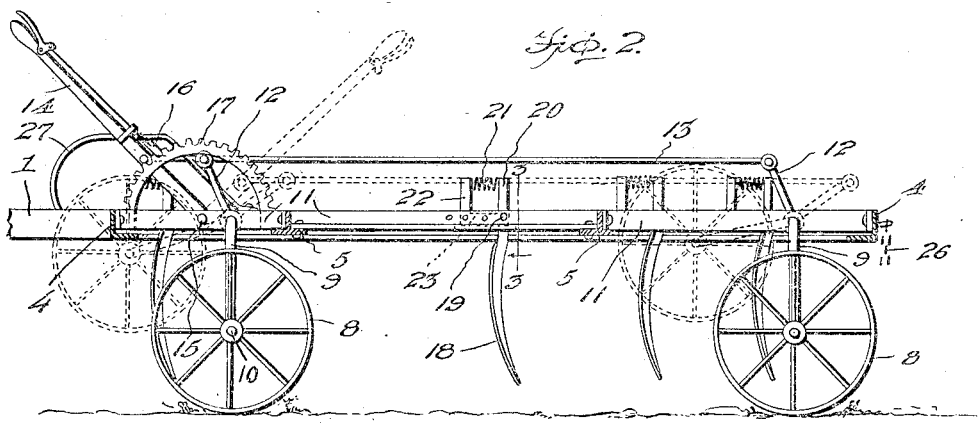
INVENTOR
David W. Tozier.
WITNESSES
BY
ATTORNEY

UNITED STATES PATENT OFFICE.

DAVID W. TOZIER, OF KELLIHER, MINNESOTA.

SPRING-TOOTH HARROW.

1,278,793.  Specification of Letters Patent.  Patented Sept. 10, 1918.

Application filed April 30, 1917. Serial No. 165,479.

*To all whom it may concern:*

Be it known that I, DAVID W. TOZIER, a citizen of the United States, residing at Kelliher, in the county of Beltrami and State of Minnesota, have invented certain new and useful Improvements in Spring-Tooth Harrows, of which the following is a specification.

One object of my invention is to provide a harrow tooth having a resilient mounting whereby breaking of the tooth is prevented should an obstruction be encountered upon the field.

Another object of this invention is the production of means for adjusting the tension of coil springs used as connections for the teeth, thus allowing the teeth to be retained in set positions even after the springs have become stretched or worn.

Another object of this invention is the production of a frame consisting of braces on which the harrow teeth are pivotally supported, while substantially L-shaped arms are retained in adjusted set positions upon the braces, thus permitting springs to be connected to the arms and the teeth whereby the tension of the springs may be adjusted.

Other objects and advantages will appear from the following specification, reference being had to the accompanying drawing in which:

Figure 1 is a plan view of the harrow.

Fig. 2 is a longitudinal section of the harrow taken on the line 2—2 of Fig. 1 and Fig. 3 is a detail cross section on the line 3—3 of Fig. 2.

In carrying out my invention I provide an outer harrow frame 1, formed preferably of angle iron as indicated in Fig. 2. The outer harrow frame 1 includes the front and rear portions 2 and 3 respectively, the front portion 2 including the converging side members while the rear portions include the similarly converging side portions which terminate in cross members 4 in each case.

Cross pieces 5 formed of T-angle iron, are secured to the side members of the harrow frame 1 and serve to rigidly support the side members against buckling. The cross-pieces 5 as well as the end members 4 of the harrow frame 1 are joined together as at 6, these joints being secured by a longitudinal bolt 7 which passes lengthwise of the frame as slearly shown in Fig. 1. Should it at any time be desired to use but one half of the harrow frame, the bolt 7 may be removed and the half portion of the harrow then used. The obvious advantage in the construction as above outlined is that very often a harrow must be used in confined places and where the same is of a certain fixed dimension which would preclude it being used in a confined place, it would obviously be necessary to use another implement. With the use of my device by simply removing the bolt 7 one half of the harrow frame may then be used and thus secure the additional advantage of a smaller implement.

Wheels 8 are supported on the ends 9 of axles 10 which are pivotally mounted in supplemental brace members 11. The brace members 11 are constructed of double T-angle irons as illustrated more clearly in Fig. 3. It will be observed that in Fig. 1 the supplemental brace members 11 which are disposed between the cross pieces 4 and 5 are similar in construction to the brace members 11 between the cross pieces 5 in the center of the harrow frame. It is therefore to be understood that the brace members 11 are identical in construction throughout but that the supplemental brace members 11 between the end member 4 and the cross pieces 5 serve the additional function of supporting the axles 10 of the ground wheels 8.

Cranks 12 are fixedly secured to the axles 10 and have their upper ends joined by a reach bar 13 which is pivoted to a lever 14. The lever 14 is in turn fulcrumed as at 15 upon the harrow frame and is provided with a detent 16 which coöperates with the quadrant 17 in the well known manner. By moving the lever 14 over the quadrant 17, the relative adjustment of the harrow frame 1 with respect to the ground is obtained, and the harrow teeth presently to be described, are permitted to sink into the ground a corresponding distance.

Harrow teeth 18 are fulcrumed as at 19 between the double T portions of the supplemental brace member 11. Each harrow tooth 18 includes an upwardly extending portion 20 to which a contractile spring 21 is secured. The contractile spring 21 is secured at its opposite end to the arm 22 of an adjusting member which includes a horizontal portion 23.

The portion 23 is apertured as shown in Fig. 2 so that the securing bolt therefor may be moved into a suitably arranged opening in the sides of the double T base members 11 and through the opening in the horizontal portion 23, so as to increase the tension of the contractile spring 21 and consequently shift the point of the harrow tooth 18 forwardly. The contractile spring 21 is preferably secured to the arm 22 and the extension 20 through the medium of eye bolts not shown. It will be observed in Fig. 2 that the harrow teeth 18 are curved so that they may be sufficiently rigid to prevent buckling and bending thereof when the ground is encountered in moving the harrow over the ground. When the harrow teeth 18 encounter an obstruction upon the ground they will be consequently rocked upon their fulcrums 19 with the result that the contractile springs 21 will be extended as far as the respective tooth is moved. As soon as the obstruction is overcome, the contractile spring 21 will pull the harrow tooth back to its normal position. The purpose of providing the adjustable members 22, is to add resiliency to the contractile springs 21 as it were, as in such an event where through continued expansion of the springs 21 the certain degree of their resiliency may be lost. Then by moving the adjusting member 22 rearwardly and securing it in the position through the medium of the securing bolt and the adjusting apertures, the harrow tooth will again be set forwardly to its normal position (assuming that through the loss of resiliency of the contractile springs 21, the harrow teeth would tend to normally drag rearwardly) and thus restore the usefulness of the spring as well as of the harrow teeth.

The harrow is drawn over the ground through the medium of a swingle tree 24 to which a hitching device 25 is secured. The swingle tree 24 is joined with the front member 4 of the harrow frame 1 by chain sections 26 as shown in Figs. 1 and 2.

Guards 27 are secured to the upper edges of the side members of the harrow frame 1 as shown in Fig. 1, these guards serving as hand holds which may be grasped by the operator to shift the harrow about in order to guide it over the field.

The operation of the device is as follows: Upon moving the harrow upon the field, the lever 14 of each of the harrow sections is adjusted so that the wheels 8 are disposed at a proper distance relatively to the harrow frame to secure the proper penetration of the harrow teeth 18 into the ground. An obvious advantage of forming the harrow into two sections as previously explained and as clearly seen in Fig. 1, is that the respective harrow teeth of the two sections may be adjusted to various steps of penetration and thus the field may be harrowed at different steps should it be desired to do so.

As the harrow is now moved over the ground through the medium of the swingle tree 24, the teeth 18 will burrow into the ground. When one of the teeth 18 strikes some obstruction it will be rotated upon its fulcrum 19 in a backward direction causing the extension of the contractile spring 21. As soon as the obstruction is overcome the contractile spring 21 will pull the harrow tooth 18 back to its normal position as fully explained in the foregoing description.

As is indicated by the dotted line position of the wheels 8 in Fig. 2, the adjustment of the harrow teeth 18 to and from the ground is secured by moving the wheels relative to the frame 1 which in effect raises and lowers the teeth.

Should the harrow frame in its entirety be too wide to permit of its use in a confined place, one half section thereof may be removed by releasing the bolt 7 when one half of the harrow frame can be used.

Having thus described the construction which is that of a generally preferred form it may be stated that modifications and changes in the construction thereof may be made without departure from the spirit of the invention or the scope of the claims.

I claim—

1. In a device of the class described, the combination of a frame, a harrow tooth pivotally mounted upon said frame, a coil spring connected to said harrow tooth, an arm adjustably mounted upon said frame, said spring also being connected to said arm, thus causing the tension of the spring to be increased when necessary by the adjustment of said arm, thus normally retaining said tooth in an adjusted set position.

2. In a device of the class described, the combination of a frame, a harrow tooth pivotally mounted upon said frame, a spring connected to said harrow tooth, an arm having a horizontally extending portion projecting therefrom, thus forming a substantially L shaped structure, said frame being provided with openings, retaining means passing through said openings and engaging the horizontal portion of said arm for retaining the arm in an adjusted set position, said spring being connected to the harrow teeth and to said arm, thus causing said spring to hold said tooth in an adjusted position.

3. In a device of the class described, the combination of a frame, said frame including inverted double T braces the double portions of said braces having alined openings, harrow teeth projecting through the braces and being pivotally mounted between the double portions of said braces, said teeth having upwardly extending portions, arms having horizontal portions, thus forming substantially L shaped structures, said arms fitting between the double portions of said braces, thus riding upon the lower portions of the braces, means passing through the openings of said double portions and engaging the horizontal portions of the arms for retaining said arms in adjusted set positions, coil springs connected to the upwardly extending portions of said teeth and to said arms, whereby the tension of said coil springs may be adjusted, thus normally retaining said teeth in adjusted positions.

In testimony whereof I affix my signature in presence of two witnesses.

DAVID W. TOZIER.

Witnesses:
   HENRY BLANCHED,
   O. J. DECKER.